May 1, 1945. A. P. STEELE, SR 2,375,046
MOTOR VEHICLE
Filed July 3, 1943
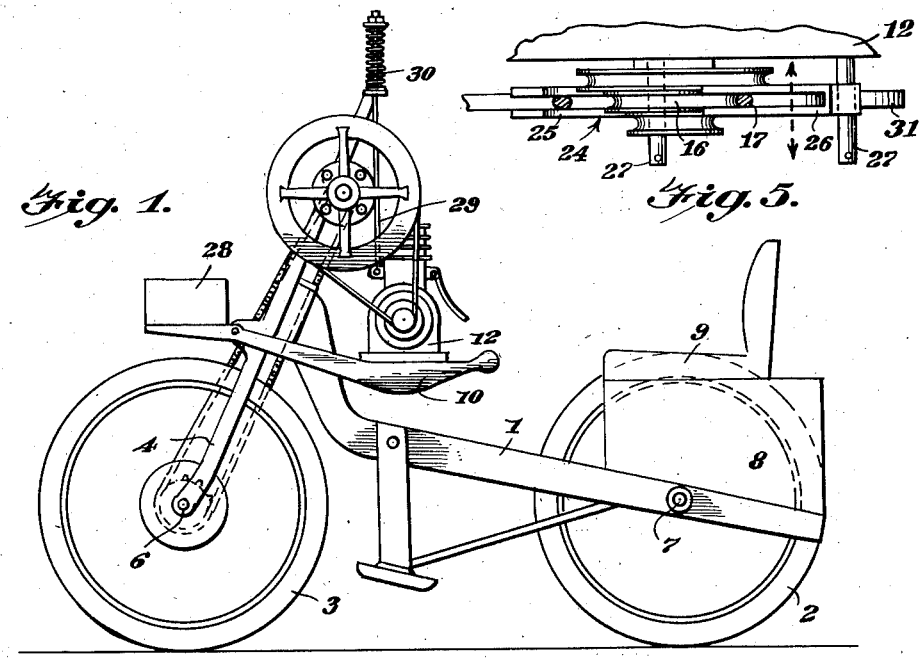
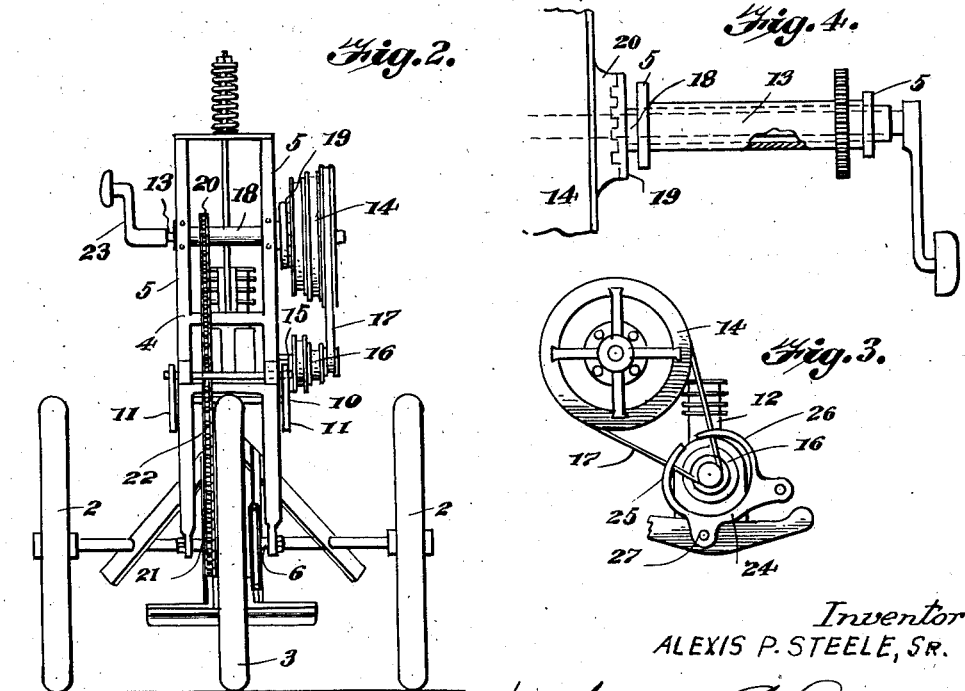
Inventor
ALEXIS P. STEELE, SR.
Attorney Patented May 1, 1945

2,375,046

UNITED STATES PATENT OFFICE 2,375,046

MOTOR VEHICLE

Alexis P. Steele, Sr., Statesville, N. C.

Application July 3, 1943, Serial No. 493,454

9 Claims. (Cl. 180—26)

This invention is directed to an improvement in means for driving and controlling motor vehicles, particularly motor cycles, wherein provision is made for extreme simplicity in driving control and in selectivity of speed ratio variation.

The primary object of the invention is to place within the direct and immediate control of the driver a means whereby he may readily govern and regulate the speed conditions of the vehicle, without the necessity of similarly regulating the speed of the engine.

A further object of the invention is the provision of a moving frame on which the motor is supported, and relative to which the weight of the motor is substantially balanced, with such frame movable at the will of the driver to regulate and control the vehicle drive.

A further object of the invention is to utilize as a part of the vehicle drive a belt cooperating with stepped pullies, and the use of the frame movement to loosen the driving cooperation of the belt with such pullies, and through an appropriate belt shifter provide any desired belt and pulley cooperation.

A further object of the invention is the provision of means whereby a hand crank may be used to start the motor and to cause rearward movement of the motor cycle at will, the hand crank under slight pressure declutching a sleeve from the upper belt drive, the propelling means for the front wheel being carried by the sleeve. Thus when the crank is being operated the front wheel is not rotated, while on withdrawal of the crank the sleeve is replaced in clutch relation and the drive connection with the front wheel is restored.

The invention in its preferred form is illustrated in the accompanying drawing, in which:

Figure 1 is a side view of the improved construction, showing the same applied to a motor cycle.

Figure 2 is a front view of the same.

Figure 3 is a view in side elevation, showing the means for varying the speed ratio of the drive.

Figure 4 is an enlarged plan view, showing the mounting and relation of the sleeve, shaft, and clutch.

Figure 5, is a detailed view showing the belt shifter in plan.

The invention as shown is applied to and will be described in connection with a motor cycle of the three-wheel type, but obviously may be applied to other types of motor-driven vehicles, without variation of the important and particular details of construction.

The vehicle illustrated is, aside from the detail specifically referred to, of more or less conventional construction, for which no specific description is necessary. However, for better understanding of the present invention, the vehicle illustrated may be briefly described as including a main frame 1, a pair of rear ground wheels 2, and a front wheel 3, the latter being the vehicle driving and steering wheel.

The wheel 3 is mounted in a fork 4, comprising spaced parallel bars 5, suitably braced for rigidity, the lower ends of which are provided with an axle 6 for the front wheel. The rear wheel axle 7 is mounted in a main frame, and such frame also supports a storage compartment 8 and a driver's seat 9.

A motor frame 10 is movably, preferably but not necessarily swingingly supported on the fork bars 5, such motor frame comprising spaced parallel bars 11, which are so mounted on the fork bars 5 as to provide a materially greater length of such frame 10 rearwardly of the fork. A conventional type of motor 12 is mounted on a platform transverse the motor frame, near the rear end of the latter, and the weight of this motor is substantially balanced while at the same time cushioned in movement by a rod 29, connected to the motor and rising through a bearing in the upper end of the fork 4, a spring 30 of requisite strength being arranged on the rod between the fork and a nut adjustable on the rod.

A drive shaft 13 is mounted transversely of the fork, and has secured at one end a stepped pulley 14. The motor shaft is provided with a corresponding but reduced pulley 16, and a drive belt 17 is arranged for driving the pulley 14 from the pulley 16. It is preferred that pulley 14 be slightly forward of as well as above the pulley 16.

A sleeve 18 is rotatably mounted in bearings carried by the forks 5, and is terminally provided with one member 19 of a clutch, the cooperating member 20 of which is fixed to the stepped pulley 14. The drive shaft 13 is mounted for support in and for free rotation in sleeve 18, and such drive shaft is permitted a limited endwise movement sufficient to separate the clutch elements 19 and 20, for a purpose to later appear.

When a hand crank is placed on the projecting end of drive shaft 13, slight pressure thereon moves the shaft relative to the sleeve, to declutch the sleeve, and turning of the crank to start the motor may be carried out without turning the sleeve, which will not operate the driven wheel of the motor cycle. In providing for this drive the sleeve is provided with a sprocket 20', fixed on the sleeve and connected by a chain 22 with a sprocket 21 on the front wheel axle whereby when the sleeve 18 is driven the vehicle will be propelled. The construction described provides a simplified means for starting the motor, in that the drive shaft 13 is terminally formed with means to receive a hand crank 23, which with the clutch 19 declutched, which is accomplished by a slight longitudinal movement of the drive shaft 13, may be operated to start the motor. This crank may also serve as a means for inducing rearward travel of the vehicle when the sleeve is in clutched relation to the pulley 14, and as a help to the motor when necessary. Of course, when the sleeve 18 is declutched, the drive to the front wheel is not operated, as the drive is free of motor influence.

It is desirable to change the driving ratio of the motor and vehicle, and to this end there is provided a belt shifter 24, having forks 25 and 26, and slidably mounted on round studs 27, one attached to the motor 12 and the other to the frame 1. The shifting fork 25 cooperates with the belt 17 close to the pulley 16, while fork 26 cooperates with the other flight of the belt between the motor and pulley 14. In changing the belt and pulley relation, the motor frame 12 is lifted, freeing the belt, causing the fork 26 to move closer to the pulley 14. The belt shifter is moved laterally on the studs 27 and the belt shifted to the desired grooves in the pullies. When the motor frame is lifted the distance between pullies 14 and 16 is shortened, resulting in that the belt hangs nearly free of pulley 16, while being kept in motion by pulley 14 sufficiently for easy shifting.

That portion of the motor frame 10 in advance of the wheel fork 4 is utilized as a support for a fuel tank 28, with suitable feed connections to the motor 12.

It will be apparent from the above description that the swinging frame, or even when otherwise mounted, is freely movable up or down, but is held against lateral movement. In this way, the rear end of the motor frame is formed as a convenient handle 31, within convenient reach of the occupant of the seat 9, by which the motor frame may be moved for vehicle steering. It is also to be noted that the swinging or like movement of the motor frame 10 by the driver while gripping the handle 31, will vary the belt grip on the driving pulley 14, slackening the belt incident to the upward movement of the motor pulley 16. Thus the driver may control and even completely interrupt the driving of the vehicle at will and by a slight movement of the motor frame 10, thus providing a simple and reliable control of the vehicle speed without losing steering control, and without the necessity of carrying out the time-consuming operation of motor control or gear shifting.

The vehicle may of course be provided with conventional braking means, and the motor 12 may have the usual throttle and other desired controls, none of which form any important detail of the present invention.

From the foregoing description, it is thought to be obvious that a motor vehicle constructed in accordance with my invention is particularly well adapted for use by reason of the convenience and facility with which it may be assembled and operated.

Having thus described the invention, what is claimed as new, is:

1. A motor vehicle of the single forward steering wheel type and having a fork to carry said wheel, said vehicle including a motor frame swingingly supported on said fork and extending rearwardly of the fork to provide a steering handle, a motor supported on said frame near the rear end, driving means for the wheel including a belt connection operated by the motor and tensioned by the movement of the swinging frame.

2. A motor-driving means for vehicles of the type including a single steering wheel, including a fork for the steering wheel, a motor frame swingingly supported on said fork for movement in a vertical plane while being rigid against movement in a horizontal plane, a motor supported on the rear end of such motor frame, a drive shaft at the upper end of the fork, and driving means between said drive shaft and the wheel, including driving pullies on the drive shaft and motor shaft, and a belt connecting said pullies and tensioned by the position of the swinging frame.

3. A construction as defined in claim 2, wherein the driving means between the drive shaft and wheel includes a sleeve in which the drive shaft is rotatably mounted, a clutch connection between said sleeve and shaft-carried pulley, and a chain drive between the sleeve and steering wheel.

4. A construction as defined in claim 2, wherein a belt shifter for the belt is mounted for sliding movement, and operable to shift the belt relative to the pullies on relieving tension of such belt by lifting the motor-carried end of the frame.

5. A construction as defined in claim 2, wherein the motor frame extends forwardly of the wheel fork to provide a support for a fuel tank.

6. A construction as defined in claim 2, wherein means are provided to balance the weight of and cushion the vertical play of the motor, said means avoiding interference with manual vertical movement of the motor frame.

7. A motor driving means for vehicles of the type having a single front steering wheel and a front fork for carrying said wheel, said driving means including a frame swingingly mounted on the fork for free movement in a vertical plane but held against relative movement in a horizontal plane, a motor carried by said frame rearwardly of the fork, a drive shaft mounted in the upper end of the fork, clutch-controlled driving connections between said drive shaft and the steering wheel, a driving pulley on the motor shaft, a driven pulley on the drive shaft, and a belt cooperating with said pullies and tensioned by the position of the swinging frame, said swinging frame being manually movable at will to vary such belt tension.

8. A construction as defined in claim 7, wherein the pullies are each of stepped formation, and wherein a belt shifter provides selective cooperation with the belt, manual upward movement of the swinging frame changing the belt tension for belt-shifter control of the belt.

9. A motor vehicle having a motor drive including a belt pulley driven by the motor, a drive shaft connected to the pulley, a rotatable sleeve held against longitudinal movement and through which the shaft freely passes, a sprocket on the sleeve, vehicle driving means operated by said sprocket, a clutch member on the sleeve, and a cooperating clutch member on the pulley, the shaft being adapted to receive a hand crank and under operating pressure thereon disconnect the clutch members and free the sleeve from the driving influence of the pulley whereby the crank may operate the pulley and parts connected thereto without turning the sleeve to drive the vehicle wheel forward.

ALEXIS P. STEELE, Sr.